United States Patent [19]

Miura

[11] Patent Number: 5,583,715
[45] Date of Patent: Dec. 10, 1996

[54] IMAGE DATA COMMUNICATION APPARATUS

[75] Inventor: Shigeo Miura, Tokyo, Japan

[73] Assignee: Canon Kabushiki Kaisha, Tokyo, Japan

[21] Appl. No.: 263,404

[22] Filed: Jun. 21, 1994

Related U.S. Application Data

[63] Continuation of Ser. No. 753,044, Aug. 30, 1991, abandoned.

[30] Foreign Application Priority Data

Sep. 3, 1990 [JP] Japan .................. 2-230590
Sep. 3, 1990 [JP] Japan .................. 2-230591

[51] Int. Cl.⁶ ............................. G11B 5/016; G11B 5/82
[52] U.S. Cl. ................... 360/99.01; 360/99.09; 360/135; 360/901
[58] Field of Search ............... 377/32; 365/227; 369/59; 360/78.04, 105, 10.1, 73.03, 78.07, 109, 99.01, 99.09, 135, 901; 368/63

[56] References Cited

U.S. PATENT DOCUMENTS

| | | | |
|---|---|---|---|
| 4,089,058 | 5/1978 | Murdock | 377/32 |
| 4,494,159 | 1/1985 | Takayama et al. | 360/78.04 |
| 4,587,643 | 5/1986 | Monen et al. | 369/59 |
| 4,717,261 | 1/1988 | Kita et al. | 368/63 |
| 4,772,962 | 9/1988 | Tanaka et al. | 360/10.1 |
| 4,816,937 | 3/1989 | Fukushima | 360/73.03 |
| 5,065,357 | 11/1991 | Shiraishi et al. | 365/227 |
| 5,198,942 | 3/1992 | Iizuka et al. | 360/78.04 |

*Primary Examiner*—David C. Nelms
*Assistant Examiner*—Trong Phan
*Attorney, Agent, or Firm*—Fitzpatrick, Cella, Harper & Scinto

[57] ABSTRACT

There is disclosed an image data communicating apparatus which has a floppy disc drive and can store communication image data onto a floppy disc. The apparatus has a clock circuit, a memory, and a comparator and calculates the elapsed time at which the floppy disc drive is not driven, and when the elapsed time has reached a preset period of time, the floppy disc drive is driven, thereby moving a contact point between the floppy disc and a read/write head.

10 Claims, 6 Drawing Sheets

IMAGE DATA COMMUNICATION APPARATUS

This application is a continuation of application Ser. No. 07/753,044 filed Aug. 30, 1991, which is now abandoned.

BACKGROUND OF THE INVENTION

1. Field of the Invention

The invention relates to an image data communicating apparatus which can store image data into a flexible memory (hereinafter, referred to generically as a floppy disc but also including such other devices as diskettes, mini floppy discs, micro floppy discs and the like).

2. Related Background Art

Hitherto, in an image data communicating apparatus for transmitting or receiving image data through a wire or in a wireless manner, there is a case where a floppy disc drive is provided in addition to an image memory comprising an integrated circuit (hereinafter, referred to as an IC) for temporary storage of communication data. The apparatus is operated in accordance with a flowchart for the receiving operation shown in FIG. 1.

That is, when the image reception is started, the presence or absence of a recording sheet is discriminated in step S1. If no recording sheet exists, step S2 follows and a check is made to see if the received image memory is full or not. If YES in step S2, step S3 follows, and a check is made co see if there is remaining recording capacity on the floppy disc or not. If YES in step S3, that is, if the reception data can be recorded onto the floppy disc, step S4 follows, and the reception data is recorded onto the floppy disc. After completion of the reception in step S5, step S6 follows, and subsequent processing is executed. If a recording sheet exists in step S1, however, step S7 follows, and ordinary reception and recording of the data onto the recording sheet is executed. If the received-image memory is not full in step S2, step S8 follows, and the reception data is stored into the received-image memory. A new recording sheet is supplied later, and the stored reception data is recorded onto the recording sheet. If there is no remaining recording capacity on the floppy disc in step S3, step S9 follows, and an error processing is executed.

The apparatus also has therein: a communication data memory necessary for the above operation; a memory to store a communication result or the like, namely, what is called management data; and a clock IC to inform the time and date to the operator by means of a display or the like.

In the above conventional image data communicating apparatus, however, the reception data is recorded and received onto the floppy disc only when there is no recording sheet, there is no remaining capacity in the image memory, and there is remaining capacity on the floppy disc.

As mentioned above, in many cases, the floppy disc is used as an auxiliary memory of the image memory which is ordinarily constructed by an IC memory. This is because accessing time required to access the floppy disc is much slower than the accessing time for the IC memory, since a seeking operation of the like is needed when accessing the floppy disc.

The floppy disc is generally accessed only when memory reception and storage on the floppy disc is performed and when the user supplies a recording sheet into the facsimile apparatus after completion of the memory reception and, thereafter, reads out the stored data from the floppy disc.

Therefore, in general, the floppy disc is not accessed when recording sheets are present or when there is remaining space in the image memory. Thus, there is also a case where the floppy disc is not accessed for long periods of time such as a few months or a few years in an extreme case.

In such a case, if the floppy disc and a head are held in a state in which they are stopped at the same contact point, there can easily occur accidents such that the head and the floppy disc adhere to each other, a deformation such as a warp or the like is caused in the floppy disc, data is destroyed, and the like.

SUMMARY OF THE INVENTION

It is an object of the invention to solve the above problems and to provide an image data communicating apparatus in which, even in the case where a floppy disc drive is left in a non-driving state (i.e., without being driven) for a long time and the same position on the floppy disc is held in pressure contact or with a head for a long time, a deformation such as a warp or the like of the disc, destruction of data, and damage to the head and the like can be prevented, and high reliability is obtained.

To accomplish the above object, according to a preferred embodiment of the invention, there is provided an image data communicating apparatus which has a floppy disc drive and can store communication image data onto a floppy disc, wherein the apparatus has clock means, memory means, and comparing means, and an elapsed time during which the floppy disc drive has not been driven is calculated, and when the elapsed time has reached a present value, the floppy disc drive is driven, to change the point of contact between the floppy disc and a read/write head.

According to another preferred embodiment, there is provided an image data communicating apparatus in which, in the above construction, when a power failure in a commercially available power source has occurred, the operations of the clock means and the memory means are continued by a backup power source and, further, when the time and data of a clock of the clock means have been corrected, the time and date data stored in the memory means are corrected and are again stored therein, thereby accomplishing the above object.

According to further another preferred embodiment of the invention, there is provided an image data communicating apparatus wherein, in the above construction, the memory means stores the time and data at which the floppy disc drive has finished being driven, the clock means calculates the elapsed time after the end of the driving, and, when the comparing means detects that the elapsed time has reached a preset value, the floppy disc drive is driven, to change the point of contact between the floppy disc and the read/write head, and, in the case of constructing the clock means and the memory means so as to continue operation using a backup power source in the event of a power failure in the commercially available power source, even if such a power failure has occurred, the storage of the time and data at which the floppy disc drive was last driven, the calculation of the elapsed time from the end of such driving by the clock means, and the detection by the comparing means regarding whether the elapsed time has reached the preset value or not, can be accurately executed.

According to further another preferred embodiment of the invention, there is disclosed an image data communicating apparatus wherein, in the above construction, in the case of constructing the apparatus such that when the time and date data of the clock means have been corrected, the time and date data stored in the memory means are corrected and restored, so that the calculation of the elapsed time and the detection by the comparing means regarding whether the elapsed time has reached the preset value or not, can be accurately executed.

According to further another preferred embodiment of the invention, there is provided an image data communicating apparatus which has a floppy disc drive and can store communication image data onto a floppy disc, wherein the apparatus has clock means, and the floppy disc drive is driven at least once within each length of time, which period has been set into the clock means, thereby moving the contact point between the floppy disc and a read/write head.

According to further another preferred embodiment of the invention, there is provided an image data communicating apparatus wherein, in the above construction, when read/write accesses of the communication image data to the floppy disc have been executed, the clock means is reset and the clock operation is started and, further, when a power source has been turned on, the floppy disc drive is driven to move the contact point between the floppy disc and the read/write head, and the clock means is reset to restart the clock operation.

Thus, the communication image data can be stored on the floppy disc, the floppy disc drive is driven at least once within the time period set in the clock means, thereby moving the contact point between the floppy disc and the read/write head, and preventing the floppy disc from being warped and the stored data from being destroyed.

Further another object of the invention is to provide an image data communicating apparatus wherein, in the above construction, when the read/write accesses of the communication image data to the floppy disc have been executed, the clock means is reset and the clock operation is started, thereby making it possible to prevent the floppy disc drive being driven more than is needed.

Further another object of the invention is to provide an image data communication apparatus wherein, in the above construction, when the power source is turned on, the floppy disc drive is driven to move the contact point between the floppy disc and the read/write head, the clock means is reset, and the clock operation is started, so that the contact point of the floppy disc is moved upon turn-on of the power source, disc warpage is prevented, and the operation can be certainly executed.

The above and other objects and features of the present invention will become apparent from the following detailed description and the appended claims with reference to the accompanying drawings.

DETAILED DESCRIPTION OF THE PREFERRED EMBODIMENTS

An image data communicating apparatus according to the invention will be described hereinbelow with respect to the first preferred embodiment. The case of a facsimile apparatus will now be described as that preferred embodiment.

Figure 2:
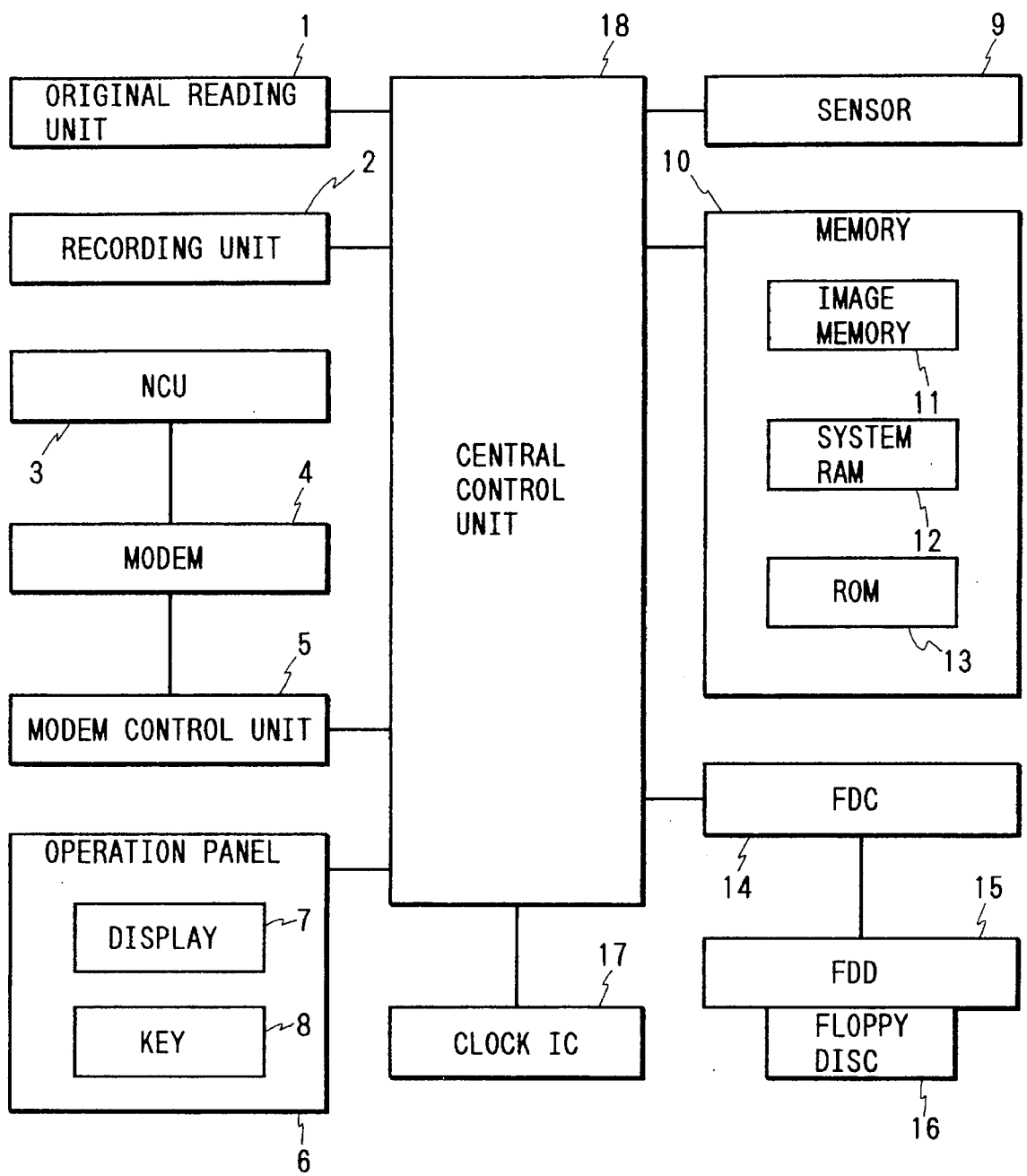
FIG. 2 is a block constructional diagram of a facsimile apparatus of the first embodiment according to the invention.
Figure 3:
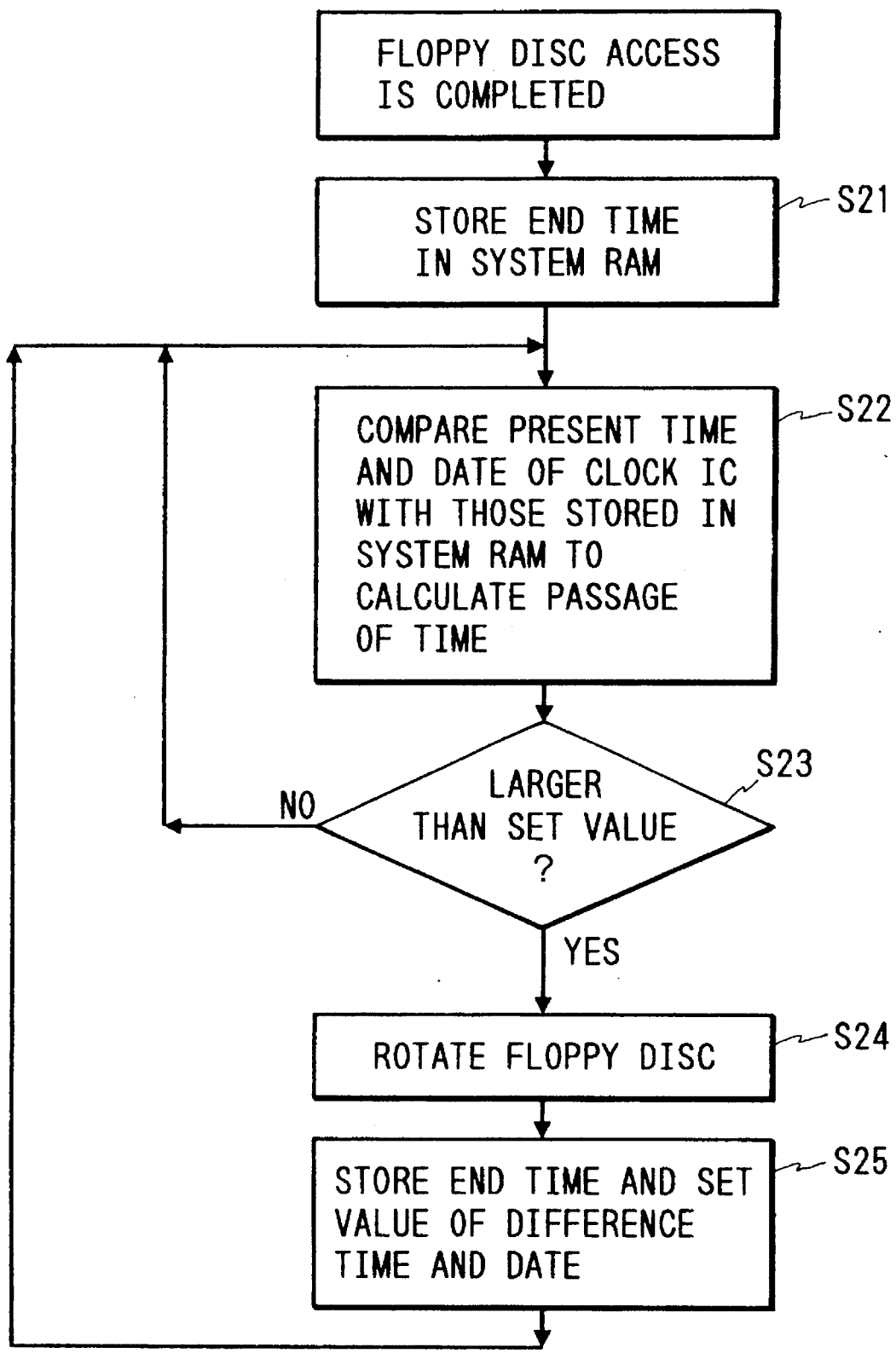
FIGS. 3 and 4 are operation flowcharts of the first embodiment.
Figure 4:
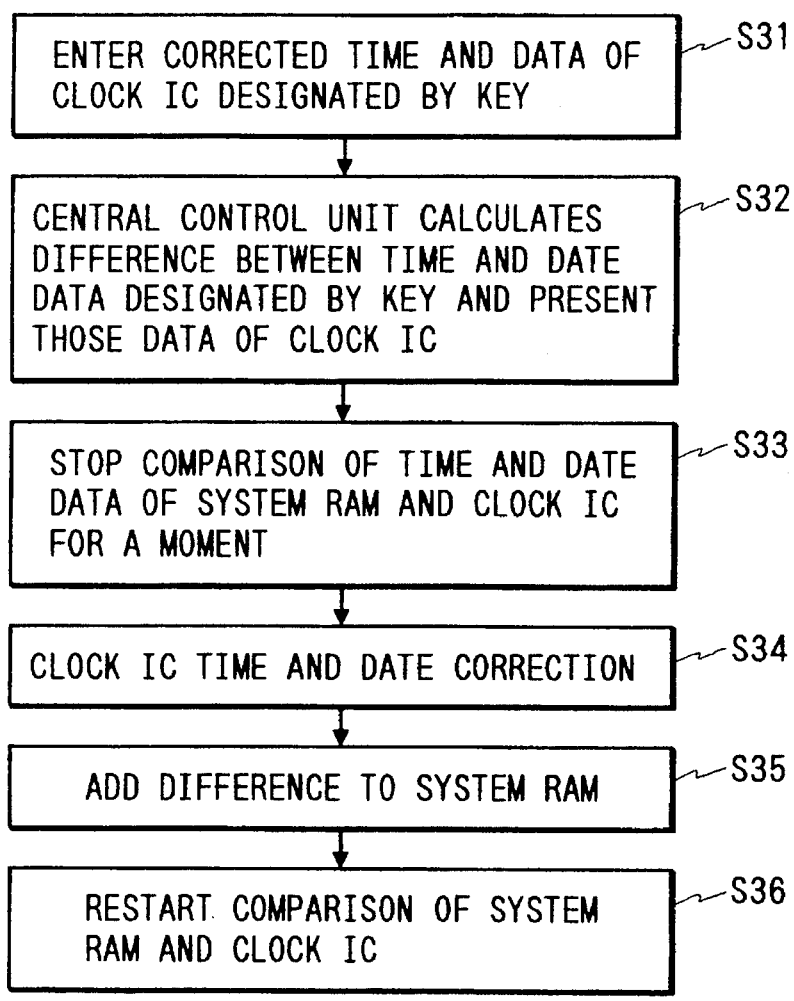
Figure 5:
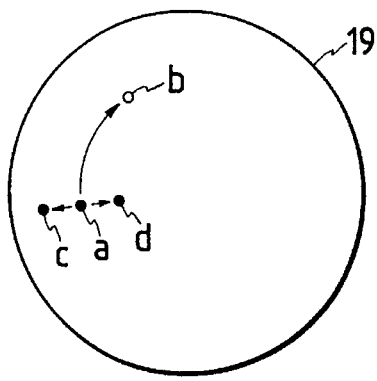
FIG. 5 is an explanation diagram of a contact point between a floppy disc and a head.

FIG. 2 is a block constructional diagram showing an embodiment according to the invention. FIGS. 3 and 4 are operation flowcharts for this embodiment. FIG. 5 is an explanatory diagram illustrating the positional relationship between a floppy disc and a head.

In FIG. 2, reference numeral 1 denotes an original reading unit for reading an image of a transmitting original and for converting it into image data; 2 a recording unit to print a reception image, a communication result report, or the like; 3 an NCU (network control unit) to connect a telephone line to the facsimile apparatus; 4 a modem (modulating/demodulating apparatus) to execute a communication; 5 a modem control unit to control the modem 4; 6 an operation panel; 7 a display to display a state of the facsimile apparatus and to provide information to the user; 8 keys to instruct various kinds of operations to the facsimile apparatus by the user; 9 a sensor to detect the state of the facsimile apparatus; 10 a memory as memory means; and 11 an image memory to store reception image data or the like. The image memory 11 also functions as a buffer of the reception image data when the data is stored onto the floppy disc. Reference numeral 12 is a system RAM as a memory which is backed up by a battery or the like (not shown) even when a commercially available power source has been shut off as in the case of a power failure or the like, and in which the stored data such as a telephone number and the like of the line to which the facsimile apparatus is connected, is not destroyed. Reference numeral 13 denotes a ROM as a memory to decide the specifications of the facsimile apparatus; 14 a floppy disc controller (FDC); 15 a floppy disc drive (FDD); 16 a floppy disc; and 17 a clock IC which is backed up by a battery or the like (not shown) and can continue operation even when the commercially available power source has been shut off as in the case of a power failure or the like. Reference numeral 18 denotes a central control unit to control the components 1 to 17. The central control unit 18 functions as a comparing means and also functions as a clock means together with the clock IC 17.

Figure 1:
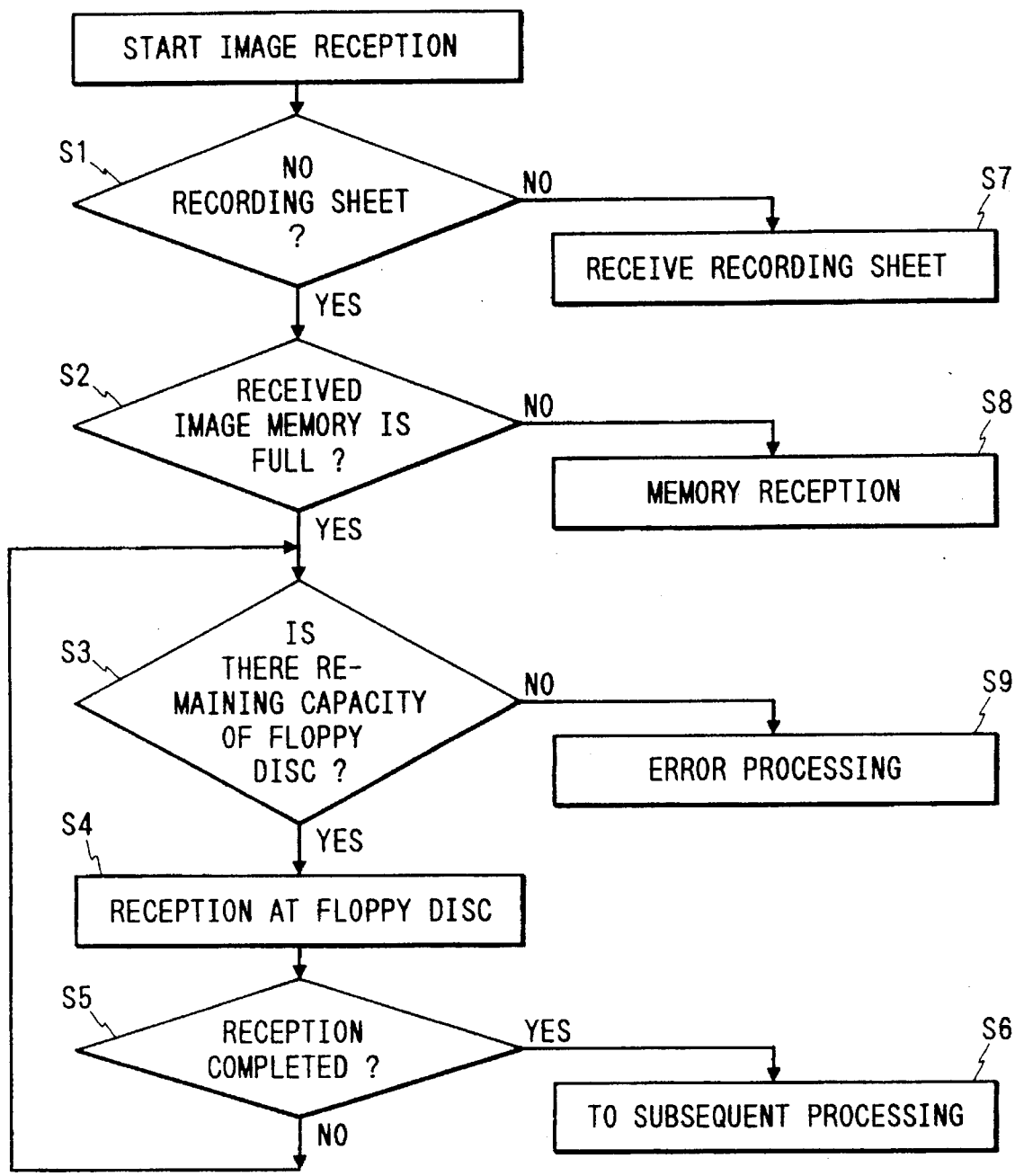
FIG. 1 is a flowchart showing the prior art receiving operation.

The operation of the embodiment with the above construction will now be described. First, in a manner similar to the operations described in the conventional technique with reference to the flowchart of FIG. 1, when image reception is started, the apparatus operates in accordance with the flow in steps S1 to S9. After completion of the reception in step S5, the processing routine advances to step S6 and the operations shown in a flowchart of FIG. 3 are executed as an operation of a subsequent processing.

That is, after the access to the floppy disc 16 is finished, the processing routine advances to step S21 in FIG. 3 and the end time and date of the access are stored into the system RAM 12 shown in FIG. 2. In addition to the above end time and date data, set value data (hereinafter, referred to as difference time and date data) indicating the elapsed time (days and hours) at which the contact point between the floppy disc 16 and the head should be moved from the access end time and date has also been stored in the system RAM 12. In the next step S22, the central control unit 18 shown in FIG. 2 compares the clock time of the clock IC 17 and the access end time and date data and calculates the elapsed time and date. If the elapsed time and date have exceeded the difference time and date in step S23, step S24 follows. In step S24, the floppy disc drive 15 is driven, the floppy disc is accessed, the floppy disc is rotated, and the contact point between the floppy disc and the head is changed.

After completion of the above operations, the processing routine advances to step S25 and the end time and date and the updated difference time and date are stored into the system RAM 12.

Even when the commercially available power source has been shut off due to a power failure or the like, the system RAM 12 and the clock IC 17 can continue their operations because they are backed up by the battery or the like as mentioned above. When the power source is again turned on, therefore, the central control unit 18 can restart the comparison between the clock time of the clock IC 17 and the access end time and date, and the operations in steps S21 to S25 are correctly executed.

The user can correct the clock time of the clock IC 17 by using the keys 8 shown in FIG. 2. FIG. 4 is a flowchart showing the processing in the above case. As shown in FIG. 4, in steps S31 and S32, a difference between the corrected time and date data of the clock IC 17 and the time and date data of the clock IC 17 before correction is calculated. The processing routine advances to step S33, and the operation to calculate the elapsed time and date in step S22 in FIG. 3 is once stopped. In the next step S34, the time and date data of the clock IC 17 is corrected. Step S35 then follows, and the difference time and date data calculated in step S32 are added to the difference time and date data stored in the system RAM 12. In the next step S36, the comparison of the time and date data which has been stopped for a moment in step S33 can be restarted.

By the above series of operations, even if the time and date data of the clock IC has been corrected, the comparison between the time and date data of the clock IC and the access end time and date data can be restarted, the difference time and date can be accurately managed, and the floppy disc drive can be driven without causing any problem.

FIG. 5 is an explanatory diagram showing the relation between the floppy disc and the head. Reference numeral 19 denotes a floppy disc magnetic material. A point a denotes the preset contact point between the head and the floppy disc magnetic material. When the floppy disc magnetic material rotates, the contact point a moves to, for instance, point b.

When the head is moved toward the outer rim, the contact point is moved to, for instance, point c. When the head is moved toward the inner rim, the contact point is moved to, for instance, a point d.

As mentioned above, in the floppy disc, the head and the floppy disc magnetic material are always in contact with each other. By driving the floppy disc drive, the floppy disc magnetic material is rotated or the head is moved, so that the contact point can be moved to any portion of the floppy disc magnetic material.

That is, the rotation of the floppy disc when the difference time and date have elapsed, which has been described with reference to the flowchart of FIG. 3, corresponds to the movement of the contact point between the floppy disc magnetic material and the data read/write head.

As means for moving the above contact point, the head can be also moved toward the outer or the inner rim, in place of the rotation of the floppy disc in step S24 in the above embodiment. Or, a writing or reading operation can be also executed. A similar effect is also derived by the above constructions. Those constructions are also incorporated in the invention.

A memory to store what is called management data such as communication results or the like which has conventionally been equipped for the apparatus and a clock IC to display the time and date by the display or the like and to inform to the operator or the like are directly used as the above memory and clock IC, thereby enabling the apparatus to be constructed without adding any special hardware. An apparatus of low cost can thus be provided to the user.

As described above, according to the invention, the clock means calculates the elapsed time from the end time and date of the driving of the floppy disc drive which have been stored in the memory means. When it is detected that the elapsed time has reached the preset time, the control means causes the floppy disc drive to be driven, and the contact point between the floppy disc and the read/write head (the idle position of the head) is moved. Therefore, the warp of the floppy disc and the destruction of the communication data due to a state in which the head is stopped in a contact state at the same position of the floppy disc for a long time, can be prevented.

In place of the driving of the floppy disc drive, it is also possible to rotate the floppy disc in a short time, to move the read/write head, or to perform a writing or reading operation onto/from the floppy disc for a short time.

In the case of continuing the operations of the clock means and the memory means by means of the backup power source at the time of a failure of the commercially available power source, even if such a power failure has occurred, the storage at the end time and date of the driving of the floppy disc drive, the calculation of the elapsed time from the end of the driving by the clock means, and the detection by the comparing means regarding whether the elapsed time has reached the preset time or not, can be accurately executed. Further, in the case of constructing such that when the time and date of the clock means have been corrected, the time and date data stored in the memory means is corrected and restored, even if the time and date of the clock have been corrected, the calculation of the elapsed time and the detection by the comparing means regarding whether the elapsed time has reached the preset time or not, can be accurately executed. Thus, warping of the floppy disc and destruction of the communication data can be more effectively prevented. The floppy disc drive is not driven earlier than the set period of time.

That is, it is possible to provide an image data communicating apparatus which can prevent warping of the floppy disc and destruction of the communication data due to a state in which the head is stopped in a contact state at the same position of the floppy disc for a long time.

The clock means and the memory means as disclosed above are not particularly necessary to the invention, but a clock IC and a memory provided for the conventional image data communicating apparatus can be used.

The second preferred embodiment of the invention will now be described.

In the first embodiment, the non-driving time of the floppy disc drive is calculated by the clock IC and the floppy disc drive is driven after the elapse of a predetermined time. In the second embodiment, however, the floppy disc drive is driven each time a predetermined time elapses, as determined using a timer.

Figure 6:
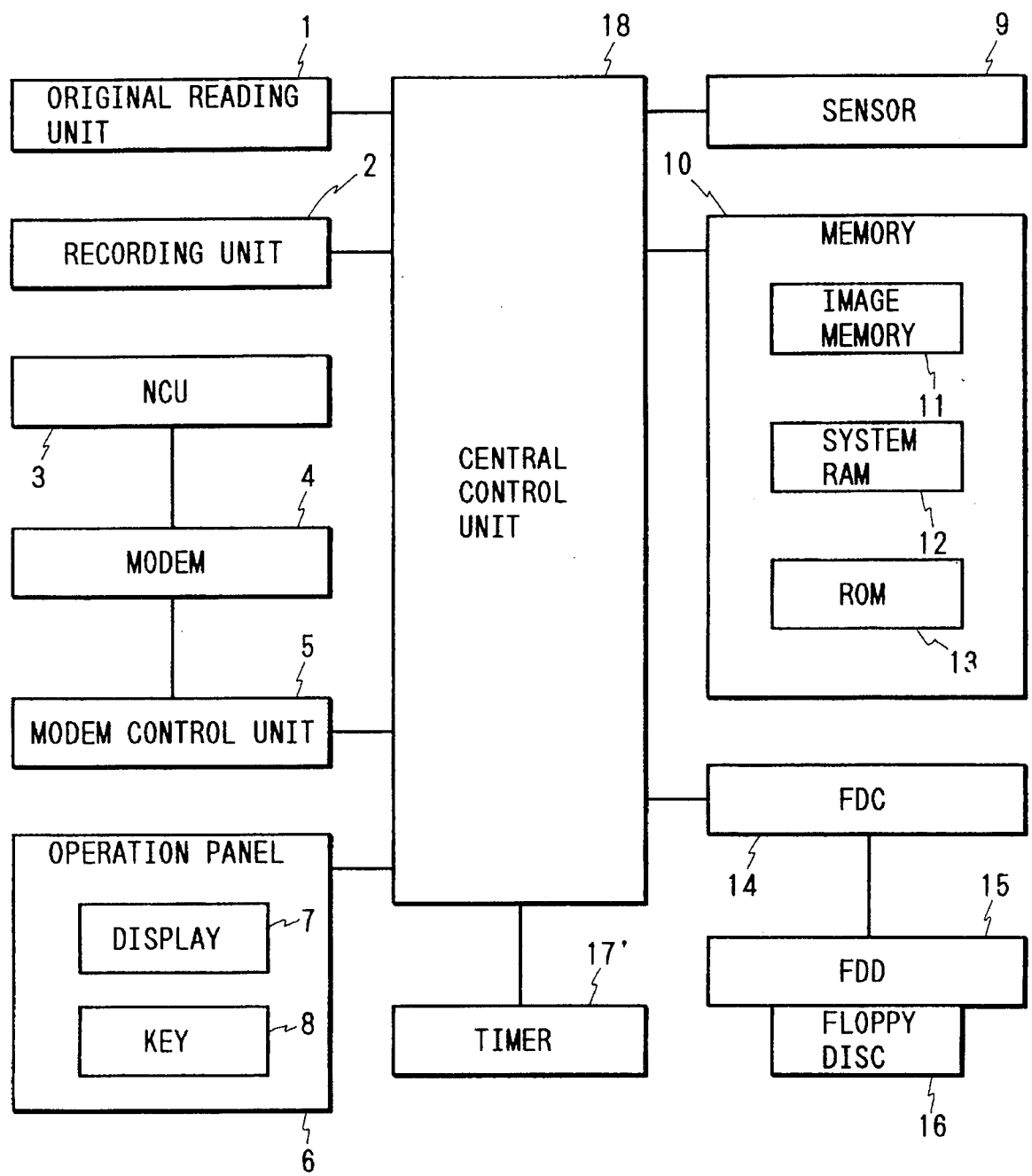
FIG. 6 is a block diagram showing a construction of the second embodiment of the invention.

FIG. 6 is a block diagram showing a construction of an image date communicating apparatus in the second embodiment. The same parts and components as those shown in FIG. 2 are designated by the same reference numerals and their descriptions are omitted.

FIG. 6 differs from FIG. 2 with respect to a timer 17' as clock means.

The timer 17' as clock means is constructed in a manner such that its operation is started when the power source is turned on, and when the time during which the floppy disc has not been accessed has exceeded a set time, a signal is sent to the central control unit so as to change the contact position between the floppy disc and the head.

Figure 7:
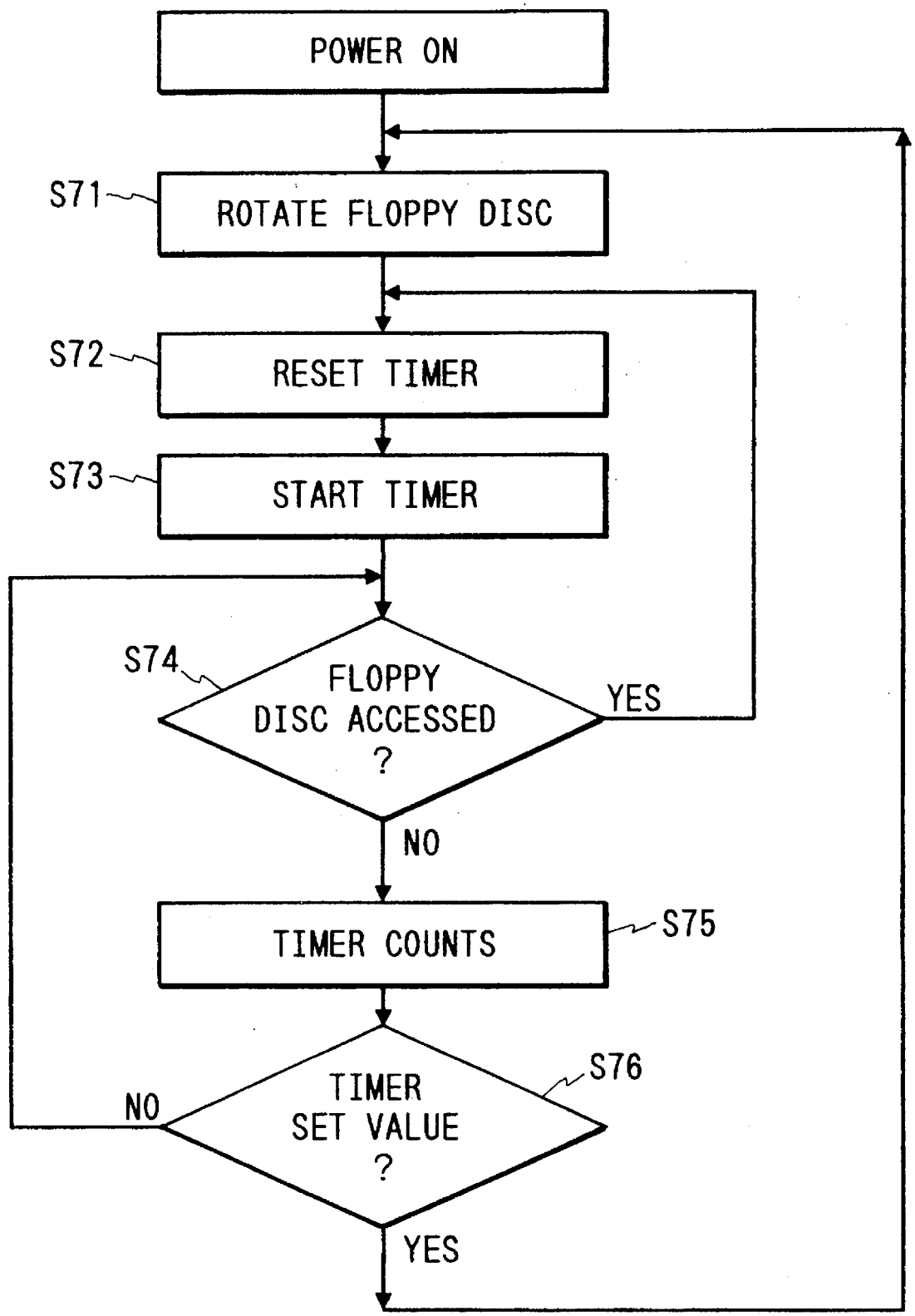
FIG. 7 is a flowchart for explaining the second embodiment of the invention.

The operation of the embodiment with the above structure will now be described. The fundamental transmitting and receiving operations of image data are similar to those described with reference to the flowchart of FIG. 1. When the image reception is started, the apparatus operates in accordance with the flow in steps S1 to S9. In association with the above operations, the operations shown in a flowchart of FIG. 7 are executed.

First, when the power source is turned on, the floppy disc is rotated in step S71. In the next step S72, the timer 17' is reset. In step S73, the timer starts the clock operation. In step S74, a check is made to see if an access to read/write data or the like has been executed to the floppy disc or not. If NO, step S75 follows and the timer executes the counting operation.

A check is now made in step S76 to see if the count value has reached a timer-set value or not. If NO, the processing routine is returned to step S74, and the counting operation is resumed.

When the count value of the timer has exceeded the set value, the timer sends an instruction signal to the central control unit 18 so as to rotate the floppy disc in step S76. After that, the processing routine is returned to step S71 and the central control unit 18 rotates the floppy disc in response to such an instruction signal. Step S72 subsequently follows and the timer is again reset, thereby restarting the operation of the timer in step S73.

After the operation of the time, has been started in step S73, if the floppy disc has been accessed in step S74 before the count value reaches the timer set value, rotation of the floppy disc by the timer is not performed. After completion of the access to the floppy disc, the processing routine is returned to step S72 and the timer is again reset, thereby restarting the operation of the timer in step S73.

The contact positional relation between the floppy disc and the head is as already described in FIG. 5 mentioned above.

As mentioned above, in the floppy disc, the head and the floppy disc magnetic material are always in contact with each other. By rotating the floppy disc magnetic material by driving the floppy disc drive or by moving the head, the contact point can be moved to any section of the floppy disc magnetic material.

That is, the rotation of the floppy disc in step S71 when the count value has exceeded the timer set value and when the power source is turned on, which has been described with reference to the flowchart of FIG. 7, corresponds to the movement of the contact point between the floppy disc magnetic material and the data read/write head.

As means for moving the contact point in step S71, in place of the rotation of the floppy disc, the head can be also moved toward the outer or inner rim, or a writing or reading operation can also be performed. A similar effect can be also derived by the above variant constructions. Those constructions are incorporated in the invention.

As described above, according to the invention, the communication image data can be stored onto the floppy disc, the floppy disc drive is driven at least once within a time set in the clock means, the contact point between the floppy disc and the read/write head is moved, and warping of the floppy disc and destruction of the memory data which occur due to a state in which the head is stopped in a contact state at the same position of the floppy disc for a long time, can be prevented.

When read/write accesses of the communication image data to the floppy disc are executed, the clock means is reset and the clock operation is started. Thus, it is possible to prevent the floppy disc drive being driven in spite of the fact that the head is not in contact with the same position for a long time.

Further, when the power source is turned on, the floppy disc drive is driven, the contact point between the floppy disc and the read/write head is moved, the clock means is reset, and the clock operation is started. Thus, the contact point of the floppy disc is moved at the turn-on of the power source, trouble due to warping of the floppy disc or the like which is likely to occur with a long power shut-off, is prevented, and the operation can be reliably executed.

That is, it is possible to provide an image data communicating apparatus which can prevent warping of the floppy disc and destruction of the image communication recording data which occurs due to the head being stopped in a contact state at the same position of the floppy disc for a long time.

The clock means can be realized by a resettable timer. By providing the clock, system RAM, and comparing means, a procedure such as calculation of the elapsed time and comparison with the set value is unnecessary and a backup power source of the timer of the clock means is also unnecessary. Thus, there is an effect that the structure can be simplified.

What is claimed is:

1. An image data communicating apparatus having a plurality of recording means each being capable of recording communication image data, said plurality of recording means including a floppy disc which is driven by a floppy disc driver, said apparatus comprising:

clock means providing a present time;

memory means for storing a time indicating when the floppy disc driver is driven, according to the present time provided by said clock means; and control means for determining how long said floppy disc driver is left in a non-driving state from the time stored in said memory means and for driving the floppy disc driver in order to change a position of a read/write head of said floppy disc when said floppy disc driver is left in the non-driving state for longer than a reference time.

2. An apparatus according to claim 1, wherein operations of the clock means and the memory means are continued by a backup power source at a time of a power failure of a commercially available power source.

3. An apparatus according to claim 1, wherein said clock means provides time and date data which are corrected, and time and date data stored in the memory means is corrected and restored.

4. An apparatus according to claim 2, wherein said clock means provides time and date data which are corrected, and time and date data stored in the memory means is corrected and restored.

5. An image data communicating apparatus having a plurality of recording means each being capable of recording communication image data, said plurality of recording means including a floppy disc which is driven by a floppy disc driver, said apparatus comprising:

clock means for clocking a predetermined time interval; and control means for driving said floppy disc driver on a basis of a clocking operation of said clock means to change an idle position of a read/write head of said floppy disc and stopping said floppy disc driver.

6. An apparatus according to claim 5, wherein when said floppy disc driver is driven to read or write the communication image data from or onto said floppy disc before the predetermined time passes, said clock means is reset to start to clock the predetermined time.

7. An apparatus according to claim 5, wherein when a power source is turned on, said floppy disc driver is driven to move the read/write head of said floppy disc to another position and said clock means is reset to start to clock the predetermined time.

8. An image communication apparatus, comprising:

image communication means for communicating image data;

recording and reproducing means for recording information relating to the image data communicated by said image communication means;

counter means for counting an inoperative period of said recording and reproducing means; and control means for driving said recording and reproducing means for a predetermined time when a count value of said counter means exceeds a predetermined value, to change a relative position between a recording medium and a head.

9. An apparatus according to claim 8, wherein said recording and reproducing means is a floppy disc drive.

10. An apparatus according to claim 9, wherein said control means resets said counter means when said control means drives said floppy disc drive.

* * * * *